UNITED STATES PATENT OFFICE.

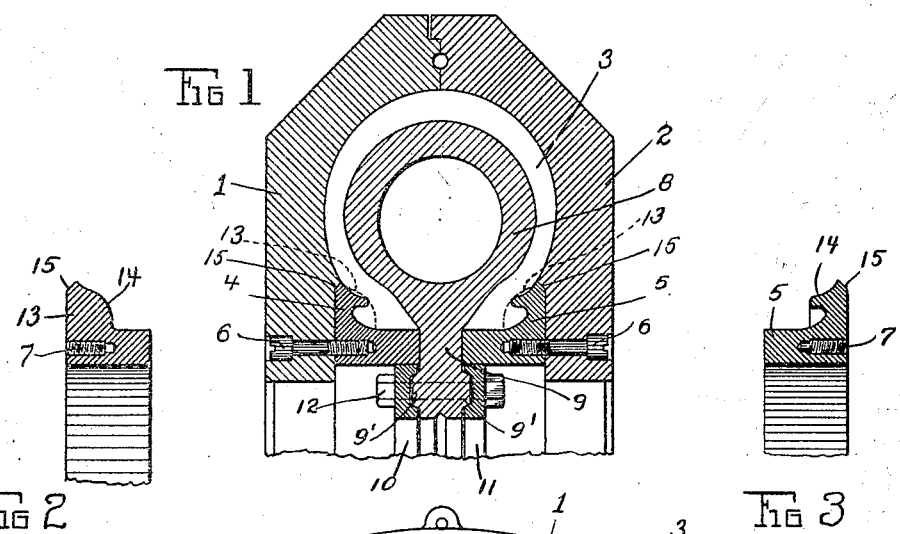
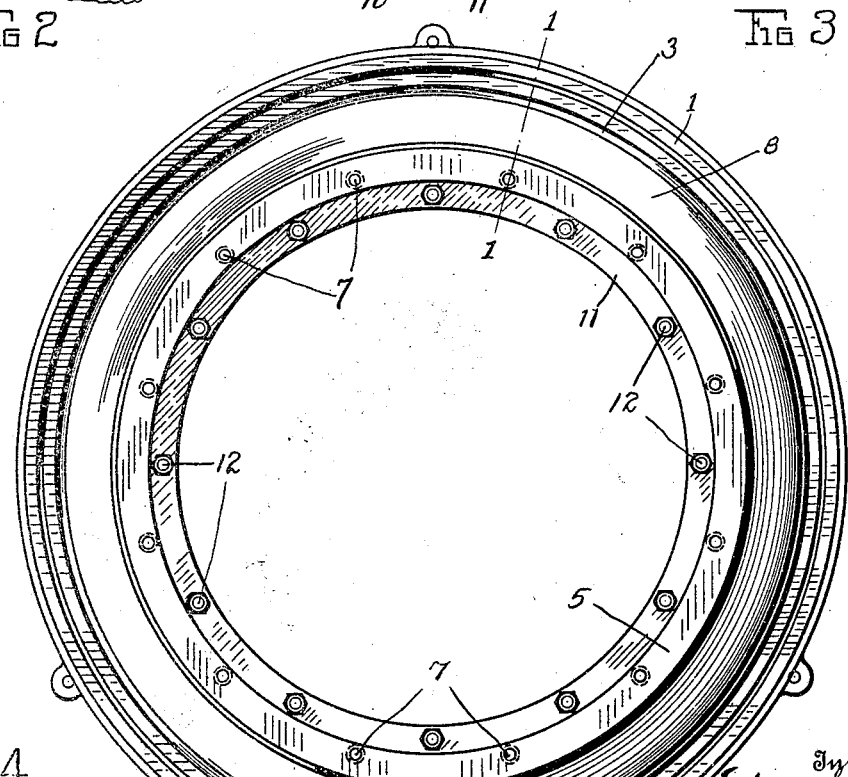

EDISON G. HULSE, OF AKRON, OHIO, ASSIGNOR TO KELLY-SPRINGFIELD TIRE COMPANY, OF JERSEY CITY, NEW JERSEY, A CORPORATION OF NEW JERSEY.

TIRE-MOLD.

1,283,778.

Specification of Letters Patent.

Patented Nov. 5, 1918.

Application filed December 11, 1916. Serial No. 136,251.

*To all whom it may concern:*

Be it known that I, EDISON G. HULSE, a citizen of the United States, residing at Akron, in the county of Summit and State of Ohio, have invented certain new and useful Improvements in Tire-Molds, of which the following is a specification.

This invention relates to improvements in tire molds and more particularly to a mold for the outer casings of pneumatic tires.

The object of the invention is to devise a mold of the character referred to which may be employed for the purpose of molding either the casing of tires of the clencher type or tires of the straight side type by so constructing the mold that the bead portions thereof may be readily altered to conform to the type of casing being molded.

In the accompanying drawings:—

Figure 1 is a vertical section of a mold embodying my improvements, the section being on the line 1—1 of Fig. 4.

Fig. 2 is a detail in section showing one form of bead ring.

Fig. 3 is a detail in section showing another form of bead ring.

Fig. 4 is a side elevation with one of the mold sections shown removed.

Referring to the drawings, 1 and 2 represent the respective sections of the mold, which are constructed of cast iron or other rigid material so as to be unyielding in character, cylindrical in form, and are arranged to be removably placed together in any suitable manner so as to form a molding chamber 3. Removably secured to each of these main sections 1 and 2 are bead rings 4 and 5 formed preferably of steel, the rings being secured to the respective main mold sections by a series of screws 6 let through the sections 1 and 2 near the inner peripheries thereof and threaded into the respective rings 4 and 5 which are provided with screw-threaded openings 7 for that purpose, the heads of the screws being preferably countersunk in the sections 1 and 2. A rigid core 8 has its shank or internal flange 9 extended between the bead rings 4 and 5, and rings 10 and 11 having recesses with beveled sides fitted to inclined bosses 9' on the shank of the core, and clamped thereto by the bolts 12, serve to secure the core 8 firmly in position, the outer peripheries of the rings 10 and 11 being snugly fitted to the inner peripheries of the bead rings 4 and 5 for that purpose.

In Figs. 1 and 3 the rings 4 and 5 are shown shaped to form a bead of the clencher type, while in Fig. 2 there is shown a ring 13 shaped to form a bead of the straight side type. In either case, however, it will be noted that the outer periphery of these rings, or those portions thereof represented by the reference character 14, form in effect a continuation of the inner walls of the main sections 1 and 2 so as to form what is known as a rigid mold. The inner walls of the main section 1 and 2 are recessed to receive the bead ring 4 and 5, the recesses having outer beveled shoulders against which fit the beveled portions 15 of the bead rings.

In explanation of the advantages of the construction described, it may be stated that it has been customary to employ separate molds for the clencher and straight side types of casings, the bead portions of the mold sections being integrally formed therewith. By the construction described it will be seen that the same mold may be employed for either type of casing by removing the bead rings and substituting others according to the particular tire being molded. One of the particular advantages in the arrangement described is that the bead rings are connected directly to the tire sections in such a way that they will, first, be removed from the tire casing after vulcanization along with the main mold sections, and, secondly, they coact with the interior of the main mold section to form a continuation of the molding chamber so as to provide a mold of the rigid type; that is, a mold in which the walls of the molding chamber are rigid as distinguished from molds having flexible walls backed up by some sort of pressure.

Having thus described my invention, I claim:—

In a tire mold, two chambered rigid main mold sections, a rigid bead ring directly but removably attached to each mold section, each of said bead rings being so fitted to its main mold section as to form a continuation of the interior wall thereof, a rigid core coacting with said main mold sections and said bead rings to form a molding chamber, said core having an inner peripherally-extending shank fitted between said bead rings and projecting beyond the inner peripheries of the same, and holding rings attached to said shank and fitted snugly to the interior of said bead ring.

In testimony whereof, I have hereunto set my hand this 4th day of Dec. 1916.

EDISON G. HULSE.

Witnesses:
JOHN J. BIGGS,
E. W. RANNELLS.